Feb. 6, 1934.  C. M. VAN AUKEN  1,946,119
WINDSHIELD WIPER
Filed July 27, 1932
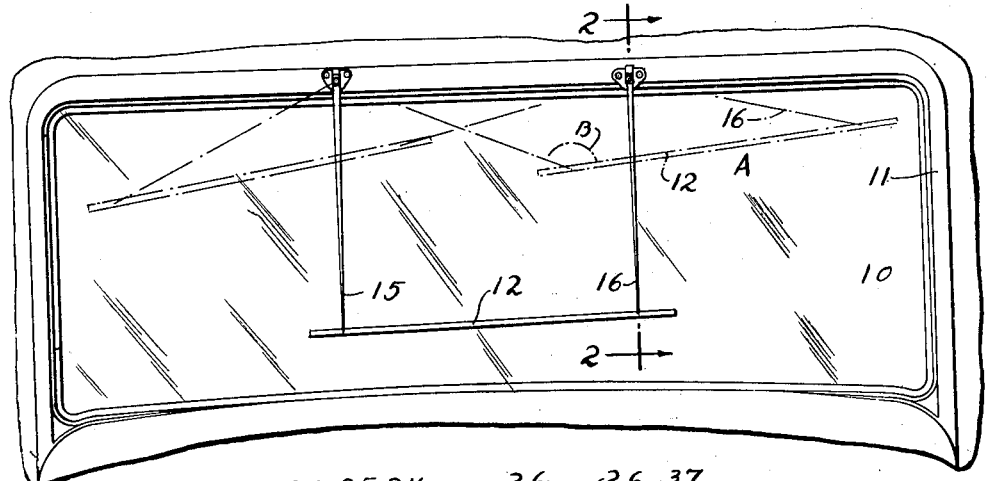
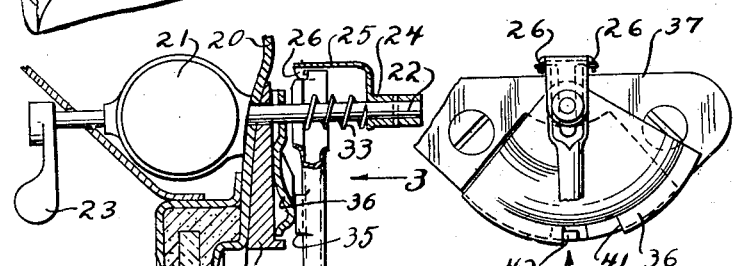
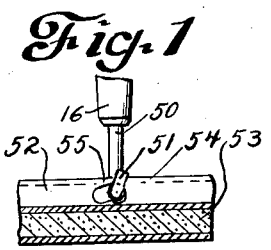
*Fig. 1*
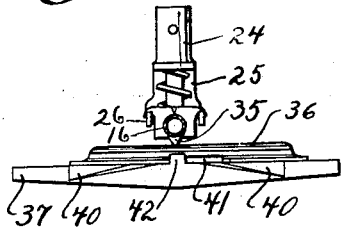
*Fig. 2*
*Fig. 3*
*Fig. 7*
*Fig. 4*
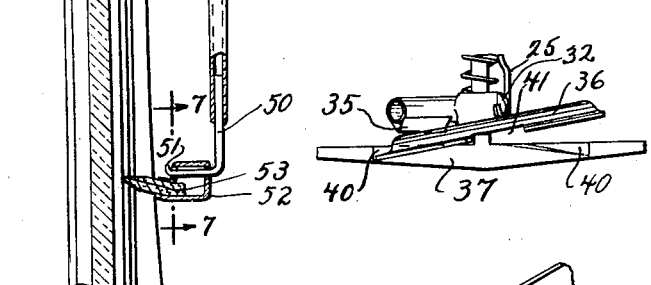
*Fig. 5*
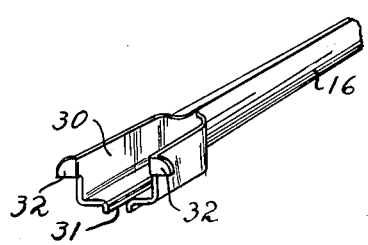
*Fig. 6*
INVENTOR
Charles M. Van Auken
BY
Evans, Frye, & Hardesty
ATTORNEY Patented Feb. 6, 1934

1,946,119

UNITED STATES PATENT OFFICE 1,946,119

WINDSHIELD WIPER

Charles M. Van Auken, Detroit, Mich.

Application July 27, 1932. Serial No. 625,022

5 Claims. (Cl. 15—255)

The present invention relates to windshield wipers and more especially to improvements in construction of such wipers as set forth and claimed in my copending application Serial No. 459,915, filed June 9, 1930.

Among the objects of the invention is to overcome certain of the difficulties encountered with the wiper of the preceding case and to facilitate manufacture and assembly thereof as well as simplify the construction.

Other objects will readily occur to those skilled in the art upon reference to the following description and the accompanying drawing in which Fig. 1 is an elevation of a windshield and wiper showing several positions of the latter.

Fig. 2 is an enlarged section on line 2—2 of Fig. 1.

Fig. 3 is an elevation of a part of the arm of Fig. 2.

Fig. 4 is a view from the bottom of the part shown in Fig. 3.

Fig. 5 is a view similar to Fig. 4 but with the parts in another position.

Figs. 6 and 7 are details of construction of one of the wiper arms.

In the drawing there is shown a windshield at 10 provided with the usual frame 11 and there is also shown a wiper of the type shown in the previous application above mentioned although it differs somewhat from the previous one in that the wiper blade 12 instead of being horizontally placed is not parallel with the upper part of the windshield but lies slightly tilted in all positions. This is illustrated in Fig. 1 which shows the three positions occupied by the wiper during a single stroke thereof. It will be noted from this figure that of the two supporting and operating arms one of these 15 is somewhat longer than the other 16 and swings about a point which is somewhat higher than that about which swings the other. Explanation of this will be made later.

In Fig. 2 the windshield is indicated at 10 and is shown as being fixed in position although of course the customary hinged or sliding mounting can be provided for if desired. In this figure the supporting portion of the body is indicated at 20 and the motor for operating the wiper at 21. This motor is provided with the operation shaft 22 and with the hand operating means 23. The shaft 22 projects from the front side of the framework and carries on it a fitting 24 which is pinned to the shaft and has a laterally projecting portion 25 which is bent longitudinally of shaft 22 as indicated clearly in Fig. 2. The extreme end of the portion 25 is provided with portions 26 which form hooks adapted to cooperate with certain portions of the wiper arm to hold the latter in position. The wiper arm (for example arm 16) at its upper end is formed as shown best in Fig. 6. In this figure the arm is shown to be opened at its upper end to form a box-like portion 30 having a slot in the bottom at 31 in which lies the shaft 22. This box-like portion has at its outer corners the two ears 32 which cooperate with the hooks 26 to hold the arm in position. The bottom of the box portion 30 acts as an abutment for a spring 33 which is in compression between this bottom portion and the member 24 and which, with the ears 32 acting as the fulcrum, tends to force the free end of the arm toward the glass. The arms 15 and 16 are substantially identical except as to length and each is provided near the upper end with a cam follower 35. This cam follower 35 cooperates with a movable cam 36 shown best in Figs. 3, 4 and 5 and the cam 36 is mounted against a suitable plate 37 fixed against the body portion 20. The cam 36 is perforated near its upper edge for the passage of the shaft 22 and swings about the latter for a purpose about to be described.

It will be noted that the plate 37 is provided with a pair of notches or depressions 40 under the cam 36 and the outer edges of these notches are somewhat closer together than the width of the cam piece. Further, the cam 36 is provided with a short notch 41 in its edge which notch embraces a stop piece or projection 42 on the plate which limits the swinging movement of the cam 36 to only a short distance.

As mentioned above the function of the present wiper includes the operation in such fashion that the wiper blade is in contact with the glass and wipes the latter only on its down stroke. The movable cam 36 and its cooperating parts provide a means for lifting the blade away from the glass about the time the wiper reaches the bottom of its stroke. The manner in which the cam accomplishes this is illustrated in Figs. 3, 4 and 5. In these figures it will be noted that, in the extreme upper position of the wiper, the follower 35 is beyond the edge of the cam 36. When, therefore, the arm starts to move on its down stroke the first action is to slide the cam 36 around until its adjacent edge comes over one of the notches 40. At this time the stop 42 maintains the cam against further movement and the follower rides up on the upper surface of the cam thrusting the edge down into the notch 40 as shown in Fig. 5. Further movement of the arm results in little or no rise of the blade until the follower 35 comes nearly to the central portion of its movement whereupon the cam 36 tilts again, lifting the edge out of the first notch 40 and, as the further edge of the cam is then beyond the second notch 40, when the cam is tilted back to its horizontal position the edge is beyond and out of the opposite notch 40 and thereby the wiper arm is maintained at a higher level out of contact with the glass. On the return movement of the arm a reverse action takes place and the arm is again lifted near the bottom of its stroke.

The present disclosure also involves the improvement in the means for connecting the wiper blade to the wiper arm. This is shown in Figs. 2 and 7. In these two figures it will be noted that the lower end of the arm consists of a rod 50 bent at right angles to the glass and having its extreme outer end bent upward at a right angle as at 51. This extreme outer end is not in the plane of the main portion of the rod 50 but is diagonal thereto. The blade holder is preferably made by forming lengthwise a strip of sheet metal to produce a tubular portion 52 of rectangular cross section (see Fig. 2) with the edges of the strip extending laterally sufficiently to hold between them the rubber blade 53. The tubular portion in its vertical walls is provided with holes for the reception of the bent end of rod 50. The hole in the rear face of the blade holder is preferably round and of such size as to make a bearing for the rod. The opening 55 in the front wall of the holder is preferably of inverted V-shape with one leg 55 longer than the other and more nearly horizontal and with the other leg 55b at only a small angle from the vertical. The apex of the V also is opposite the opening in the rear wall.

With this sort of structure, at the angles assumed by the parts during operation, the tip of the bent portion 51 of the rod 50 is always over the unperforated part of the tube wall. However, if the arm 16 is detached from the shaft 22 and is swung downwardly below the level of the blade holder, tip 51 may be readily drawn through portion 55a and out of its engagement with the holder.

As stated above, one of the arms 15 is longer than the other 16. The reason for this arrangement of the parts is to prevent cocking of the blade when being moved from position A on its wiping stroke. When the blade reaches position A and the arm 16 attempts to start the blade back, if the angle B is too large and the arm 15 and blade 12 are in approximate alignment, the thrust tends to lift one end of the blade 12 from the glass. This tendency is overcome by decreasing the angle B so that the two parts are not so nearly aligned and therefore the end thrust is broken at this point. This decrease in the angle B is best accomplished by the means indicated.

Now having described the invention and the preferred embodiment thereof, it is to be understood that the said invention is to be limited, not to the specific details herein set forth, but only by the scope of the claims which follow:

What I claim is:

1. In a windshield wiper, a pair of spaced swingably mounted arms of unequal length, a wiper blade pivotally connecting the free ends thereof and adapted to be moved downwardly and upwardly in substantial parallelism upon swinging of said arms, means for applying force to at least one of said arms to produce such swinging.

2. In a windshield wiper, a pair of spaced swingably mounted arms of unequal length, the longer of said arms extending both above and below the levels of corresponding ends of the shorter, means for applying force to the shorter arm to cause swinging thereof, and a wiper blade pivotally connecting the free ends of said arms and operated thereby.

3. In a windshield wiper having a swingable arm carrying a cam follower, a shaft upon which said arm is mounted, a fixed plate thru which said shaft extends, a cam element rotatably mounted upon said shaft adjacent said plate and backed thereby, said cam element being located in the path of movement of the follower and a stop for limiting the movement of said cam, said plate having recesses spaced at less than the width of said cam element and each of a size and shape to permit a part of said element to move thereinto and thereby render said part inoperative to lift the follower, said cam element being segment shaped and of less circumferential width than the arc of movement of said arm.

4. In a windshield wiper having a swinging arm operable by means of an oscillatable shaft, means for resiliently pressing the free end of said arm toward a windshield, said means comprising a member fixed to the free end of said shaft and having a laterally extending portion terminating in a hooked portion, and a cooperating hooked portion carried by the adjacent end of said arm, the latter being slotted for the passage of the shaft, and a compression spring below said hooked portions and engaging between said arm and said member.

5. In a windshield wiper having a motor driven oscillatable shaft and a wiper arm oscillated thereby, means for securing said arm to said shaft in operative relation comprising a fulcrum element carried by the free end of said shaft and fixed thereto with the fulcrum at that side of the shaft away from the main portion of the arm, said fulcrum element also providing a spring abutment, said arm being slotted for the passage of said shaft and provided with fulcrum engaging portions and a compression spring between said abutment and said arm.

CHARLES M. VAN AUKEN.